Patented Jan. 19, 1954

2,666,783

UNITED STATES PATENT OFFICE 2,666,783

QUATERNARY BENZYLCHLORIDE SALTS OF 3-HYDROXY 4-DISUBSTITUTED AMINO-BUTENE-1

Marion R. Lytton, West Chester, Pa., assignor, by mesne assignments, to The Chemstrand Corporation, Decatur, Ala., a corporation of Delaware No Drawing. Application March 13, 1950,
Serial No. 149,438

6 Claims. (Cl. 260—490)

This invention relates to quaternary salts of 3-hydroxy-4-disubstituted amino-butene-1 and to acyl esters thereof.

The 3-hydroxy-4-disubstituted amino-butene-1 is obtained by reacting butadiene monoxide with a secondary amine in solution or in gaseous phase, and preferably at a temperature between 25 and 90° C. The amine may be a dialkylated amine, a diarylated amine, a diaralkylated amine, or a heterocyclic secondary amine in which the hydrogenated ring is fully saturated. The reaction involves opening of the oxide ring and addition of the elements of the secondary amine to the structure to produce the butene-1 derivative, in accordance with the following scheme:

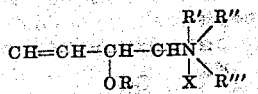

When the secondary amine is a dialkyl, diaryl, or aralkyl amine, R and R' in the above equation represent monovalent alkyl, aryl, or aralkyl radicals. When the amine is a heterocyclic amine, R and R' taken together represent the divalent residue of the heterocyclic secondary amine. Examples of the dialkylated amines which may be added to the butadiene monoxide to produce the addition products are dimethylamine, diethylamine, dipropylamine, di-isopropylamine, dibutylamine, di-isobutylamine, di-secondary butylamine, and di-myricylamine. Examples of the heterocyclic secondary amines are morpholine, piperidine, ethyleneimine, and pyrrolidine.

Acyl esters of the addition products may be obtained by reacting the addition product with a mol of the appropriate organic acid or acid anhydride whereby the ester and organic acid salt are formed in one step, and liberating the ester from the resulting acid salt by neutralization, for example by treating the salt with sodium carbonate. Appropriate acids are those of the aliphatic series containing from 1 to 12 carbons, i. e., organic acids of the aliphatic series from and including formic acid to and including lauric acid, or the corresponding anhydrides in the case of acids other than formic acid.

The addition products and acyl esters thereof are herein generically referred to as butene-1 derivatives.

In accordance with the present invention, quaternary salts of these butene-1 derivatives are prepared by heating the butene-1 derivative with a quaternizing reagent, for example, an alkyl halide, a dialkyl sulfate, an alkyl ester of an aryl sulfonate, and the like.

The new quaternary salts of the invention are illustrated by the general formula

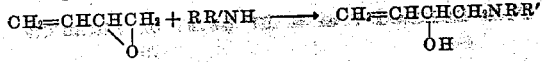

wherein R is hydrogen or an acyl radical containing from 1 to 12 carbons, R' and R'' are selected from monovalent alkyl, aryl, or aralkyl radicals, or, taken together, represent the divalent residue of a heterocyclic secondary amine, R''' is an alkyl, aryl or aralkyl group and X is an anion. More specifically, R''' is a methyl, ethyl, n-propyl, n-butyl, isobutyl, n-amyl, isoamyl, n-hexyl, isohexyl, n-heptyl, n-octyl, n-nonyl, n-decyl, n-lauryl radical, an aryl radical, or an aralkyl radical, e. g. benzyl, and X is an arylsulfonic acid radical i. e. an arylsulfonate anion, e. g. benzenesulfonate anion, a p-toluene-sulfonate anion, a methyl-toluenesulfonate anion etc.; an alkylsulfuric acid radical, i. e. an alkylsulfonate anion, e. g. methyl sulfate, ethylsulfate, n-propylsulfate, n-butylsulfate, etc., an iodide anion, a chloride anion, a bromide anion, or other acid anionic radical.

The quaternary salts of the invention can be copolymerized with at least one other $CH_2=C<$-containing compound to produce valuable inherently dye-receptive synthetic resins. Examples of $CH_2=C<$-containing compounds which are copolymerizable with the quaternary salts are acrylonitrile; acids such as acrylic, haloacrylic, and methacrylic acids; esters such as methyl methacrylate, butyl methacrylate, octyl methacrylate, methoxymethyl methacrylate, chlorethyl methacrylate and the corresponding esters of acrylic and alpha-chloracrylic acids; methacrylonitrile; vinyl and vinylidene halides such as vinyl chloride, vinyl fluoride, vinylidene chloride, vinylidene fluoride, 1-fluoro-1-chlorethylene; vinyl carboxylates such as vinyl acetate, vinyl chloracetate, vinyl propionate, and vinyl stearate; N-vinylimides such as N-vinylphthalimide and N-vinylsuccinimide; N-vinyl lactams such as N-vinylcaprolactam and N-vinylbutyrolactam; vinyl aryl compounds such as styrene and vinyl naphthalene; and other compounds such as methyl vinyl ketone, chlorotrifluorethylene, methyl fumarate, methyl vinyl sulfone, methyl vinyl sulfoxide, methyl vinyl sulfide, fumaronitrile, maleic anhydride, and vinyl trichlorosilane or its hydrolysis product.

The copolymers may contain from 1 to 99, preferably from 1 to 50, percent of the quaternary salt. In a specifically preferred embodiment, the copolymer contains from 1 to 20% of the quaternary salt, from 80 to 99% of acrylonitrile and, when these two monomers total less than 100 of the copolymer, from 1 to 19% of a third monoethylenically unsaturated copolymerizable substance such as methacrylonitrile, styrene, etc.

The copolymers may be synthesized from mixtures of the monomers in any desired proportions from 1–99 of one to 99–1% of the other by any of the known polymerization procedures including mass or bulk polymerization, polymerization in aqueous suspension or emulsion in the presence of a dispersing agent or emulsifying agent, the suspension or emulsion being maintained by any agitation method, for example by tumbling in the reactor, or through the use of any suitable rotary stirring device. A wide variety of emulsifying agents may be used. In general, any composition having both hydrophilic and hydrophobic radicals may be used, and the expression "emulsifying agent" is intended to include commercial soaps made by the saponification of animal and vegetable oils, such as sodium stearate, potassium laurate, ammonium oleate, and mixtures of these and other salts as they occur in commercially available "soaps." Other emulsifying agents are the rosin soaps, the salts of sulfonated hydrocarbons, dialkyl sodium sulfosuccinates, the salts of partial esters of sulfuric acid and high molecular weight alcohols, quaternary ammonium salts such as stearyl dimethyl benzyl ammonium chloride, non-ionic emulsifiers such as ethylene oxide condensates of hexitan monostearates, fatty acids, mercaptans and alcohols, and hexitan monostearates.

In all of the systems mentioned above, the copolymerization may be effected by heating the monomers to 30 to 100° C. in the presence of a catalyst, and under either alkaline or acid condition.

The copolymerization reaction may be catalyzed by means of any free radical catalyst. Suitable catalysts include the water-soluble peroxy compounds, for example hydrogen peroxide, sodium peroxide, sodium perborate, sodium persulfate and other alkali metal salts of peroxy acids, or other water-soluble peroxy compounds. Azo catalysts, such as azo-2,2′-diisobutyronitrile, may be used advantageously in the copolymerization. A wide variation in concentration of catalysts may be used depending on the temperature at which the copolymerization is conducted, the concentration of the monomers in the reaction mass, and the molecular weight desired in the ultimate product. From 0.1 to five percent by weight of catalyst may be used. In general, it is desirable to have a uniform reaction rate and therefore a substantially uniform concentration of the catalyst is desired throughout the reaction. An approximation of these conditions may be obtained by separately preparing the aqueous catalyst solution and adding the solution in increments periodically throughout the reaction.

The copolymers may be produced by redox polymerization in which the copolymerization is conducted in the presence of a peroxy type catalyst and a reducing agent which form a reduction-oxidation system ("redox" system) with the peroxy compounds which accelerates the copolymerization.

The new copolymers may also be produced by a special solution polymerization in which the solvent is saturated with a mixture of the monomers. The catalyst, or a portion thereof is added to the saturated solution and the copolymerization conducted just at reflux temperature by continuously adding a mixture of the monomers in predetermined proportion to the mass at such a rate as to keep the reflux temperature substantially constant. In this manner, the desired uniform concentration of each monomer is maintained in the reactor and the products are substantially homogeneous with respect to both composition and molecular weight.

The copolymerization may be conducted in the presence of molecular weight regulators which act as chain terminators and prevent the formation of very large molecular weight increments. Such regulators are exemplified in the high molecular weight aliphatic mercaptans, carbon tetrachloride, and dithioglycidol.

The new copolymers are soluble in a wide variety of solvents, depending on the composition of the copolymer. Those copolymers of the butene-1 derivatives with acrylonitrile containing from 80 to 99 percent acrylonitrile and from 1 to 20 percent of quaternized butene-1 derivative are soluble in dimethylacetamide and dimethylformamide, for example. Copolymers of these compositions are capable of fabrication into materials and articles suitable for various uses. However, they are particularly adapted to the preparation of synthetic fibers by extrusion of a solution thereof into a drying atmosphere or a nonsolvent for the polymer.

Further details of the practice of the invention are set forth in the following examples, in which the parts are given by weight.

*Example I*

Five hundred and sixty parts of butadiene monoxide (3,4-epoxybutene-1) were added to 1530 parts of a 25% aqueous dimethylamine solution at a rate such that, with rapid stirring and external cooling, the temperature rose to 45–60° C. That temperature was maintained throughout the reaction.

The mixture was stirred for 30 minutes and then heated to slow refluxing for 30 minutes. It was allowed to stand at room temperature for about 12 hours, after which solid potassium carbonate was added. An aqueous layer separated and was discarded. The nearly anhydrous product was dried for about 12 hours over solid potassium carbonate from which it was filtered, and finally distilled. Yield of 3-hydroxy-4-dimethylamino-butene-1, 510 parts (50%). The product boils at 48° C. at 14 mm.; $n_D^{23}=1.4472$.

Theory: C=62.68; H=11.30; N=12.17.
Found: C=62.71; H=11.20; N=11.89.

Forty-six parts of the 3-hydroxy-4-dimethyl-amino-butene-1 and 54.8 parts of n-butyl bromide were heated together for two hours on a steam bath. The mixture separated into two phases, one of which grew at the expense of the other until a single phase remained. On cooling, the product solidified. It was recrystallized twice from acetone. Yield of dimethylbutyl(2-hydroxy-3-butenyl)ammonium bromide, 46 parts, M. P. 78–80° C.

Theory: C=47.62; H=8.73; N=5.56; Br.=31.75.
Found: C=46.86; H=8.54; N=5.73; Br.=32.57.

*Example II*

To 280 parts of the 3-hydroxy-4-dimethyl-amino-butene-1 of Example I there were added 272 parts of acetic anhydride with stirring and external cooling. The addition required about one hour. The mixture was allowed to stand at room temperature for about 12 hours and then distilled. Yield of the acetic acid salt of the acetyl ester, 505 parts (91.5%). B. P. 70° C. at 14 mm., $n_D^{24.4}=1.4349$.

Theory: C=55.30; H=8.75; N=6.45.
Found: C=55.08; H=9.17; N=6.45.

335 parts of the salt produced as above were treated with a cooled solution of 120 parts of potassium carbonate in 250 parts of water with stirring for 30 minutes. The mixture formed layers and the organic layer was separated. On treating the aqueous layers with solid potassium carbonate, a further organic layer was obtained and combined with the first. The combined organic layers were dried over solid potassium carbonate for about 12 hours, filtered, and distilled. Yield of 3-acetoxy-4-dimethylamino-butene-1, 178 parts (65%), B. P. 66–68° C. at 14 mm.; $n_D^{26}=1.4309$.

Theory: C=61.0; H=9.55; N=8.92.
Found: C=61.54; H=9.40; N=8.68.

A mixture of 31.4 parts of the 3-acetoxy-4-dimethylamino-butene-1 and 25.2 parts of benzyl chloride was heated on the steam-bath for one hour. At the end of this time, the reaction mixture had separated into two layers. Ethanol (50 parts) was added and the heating was continued for two hours. The alcohol was then distilled off under reduced pressure and the residue was heated at 100° C. under 1 mm. pressure for 5 hours. On cooling to room temperature the product, dimethylbenzyl(2-acetoxy-3-butenyl)ammonium chloride, was obtained as a glassy solid.

Example III 4.3 parts of 3-hydroxy-4-dimethylamino-butene-1 and 5.6 parts of methyl-p-toluenesulfonate were mixed and allowed to react at room temperature. Considerable heat was evolved. After the heat rise subsided, the reaction mixture was heated one more hour on the steambath. After cooling, the product was taken up in absolute alcohol, and stored in the cold for about 48 hours. The final product, diethylmethyl(2-hydroxy-3-butenyl)ammonium p-toluene-sulfonate, occurred as a lemon-yellow, extremely viscous oil. It is copolymerizable, as such, with other CH₂=C<-containing compounds such as acrylonitrile.

Example IV 5.97 parts of 3-hydroxy-4-di-n-butylamino-butene-1 and 5.6 parts of methyl-p-toluenesulfonate were mixed and allowed to react at room temperature. There was no evolution of heat after thirty minutes. The mixture was heated for one hour on the steambath, cooled, and taken up in absolute alcohol. The mixture was stored in the cold for about 48 hours. The final product, tri-methyl(2-hydroxy-3-butenyl)-ammonium p-toluenesulfonate, occurred as a lemon-yellow, extremely viscous oil. It is copolymerizable, as such, with other CH₂=C<-containing compounds.

The invention is defined by the appended claims.

I claim:

1. A quaternary salt having the formula:

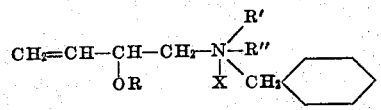

wherein R is a substituent taken from the group consisting of hydrogen and saturated aliphatic acid radicals containing from 1 to 12 carbons, R' and R'' are substituents taken from the group consisting of aryl radicals containing 6 to 10 carbons, aralkyl radicals containing up to 10 carbons, and alkyl radicals containing 1 to 12 carbons which may be joined through an atom selected from the group consisting of carbon, nitrogen, and oxygen atoms to form a saturated cyclic radical containing up to 6 atoms in the ring, and X is an anion.

2. Diethylbenzyl (2-acetoxy-3-butenyl) ammonium chloride.
3. Dimethylbenzyl (2-hydroxy-3-butenyl) ammonium chloride.
4. Dimethylbenzyl (2-hydroxy-3-butenyl) ammonium p-toluenesulfonate.
5. Diethylbenzyl (2-acetoxy-3-butenyl) ammonium bromide.
6. Dimethylbenzyl (2-acetoxy-3-butenyl) ammonium chloride.

MARION R. LYTTON.

References Cited in the file of this patent
UNITED STATES PATENTS

| Number | Name | Date |
|---|---|---|
| 2,119,802 | Westphal et al. | June 7, 1938 |

OTHER REFERENCES

Fieser et al.: "Organic Chemistry" (D. C. Heath and Co., Boston, 1944), p. 32.